Patented Oct. 2, 1934

1,975,411

UNITED STATES PATENT OFFICE 1,975,411

AZODYESTUFF

Richard Stüsser, Cologne-Deutz, Germany, assignor to General Aniline Works, Inc., New York, N. Y., a corporation of Delaware No Drawing. Application May 25, 1932, Serial No. 613,559. In Germany June 17, 1931

4 Claims. (Cl. 260—72)

The present invention relates to azodyestuffs, more particularly it relates to dyestuffs which may be represented by the general formula:

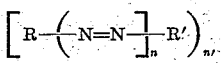

wherein R stands for the radical of a diazotized

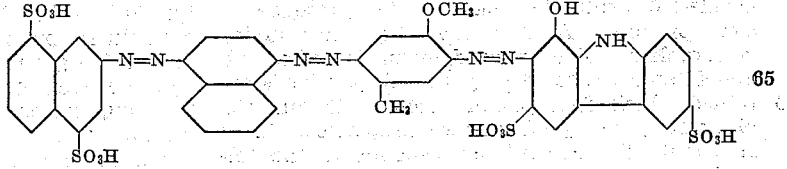

aminoazodyestuff containing at least two azo groups that means, for the radical of a diazotized aminodis-, -tris- or -polyazodyestuff, R' stands for the radical of a hydroxy-carbazole compound, the azo group being attached to R' in ortho-position to the hydroxy group, $n$ and $n'$ stand for the numbers one or two, but $n$ and $n'$ not simultaneously standing for two, and wherein R may be substituted by hydroxyl, alkoxy, aryloxy, alkyl, a substituted amino group, such as an acylamino group, the nitro group, halogen, the sulfonic acid group and the carboxylic acid group, and wherein R' may be substituted by hydroxyl, alkoxy, aryloxy, alkyl, the amino group, the nitro group, halogen, the sulfonic acid group and the carboxylic acid group.

My dyestuffs are obtainable by diazotizing or tetrazotizing a monoamino- or diamino-dis- or -polyazodyestuff and coupling with one or two equimolecular proportions of a hydroxy-carbazole coupling component. The dyestuffs thus obtained are generally dark powders, dyeing vegetable and/or animal fibers and/or leather various shades of good fastness to light.

The invention is illustrated by the following examples, without being limited thereto:

*Example 1.*—605 parts by weight of the aminodis-azodyestuff prepared from 1 molecular proportion of diazotized 2-aminonaphthalene-4.8-disulfonic acid, 1 molecular proportion of 1-naphthylamine and 1 molecular proportion of 3-amino-4-cresol-methylether are diazotized in the usual manner. The diazodisazodyestuff thus obtained is filtered off and added, while stirring, to a solution of 343 parts by weight of 1-hydroxy-carbazole-3.6-disulfonic acid in 4000 parts by weight of water, 200 parts by weight of soda and pyridine and some ice. When the coupling is complete, the dyestuff is salted out and filtered. The trisazodyestuff having in its free state the following formula:

is a black powder which dyes cotton, silk, viscose silk and chrome leather greyish-blue to bluish-black shades of good fastness to water, light and brightening.

*Example 2.*—633 parts by weight of the aminodisazodyestuff prepared from 1 molecular proportion of diazotized 2-naphthylamine-7-sulfonic acid, coupled with 1 molecular proportion of p-xylidine, further diazotized and coupled with 1 molecular proportion of 1-amino-2-naphtholethylether-6-sulfonic acid, are diazotized and coupled with 358 parts by weight of 1-amino-8-hydroxy-carbazole-3.6-disulfonic acid in the presence of pyridine. After working up the dyestuff, a dark powder is obtained which dyes cotton and viscose silk grey shades of good fastness to light. The dyestuff has in its free state the following formula:

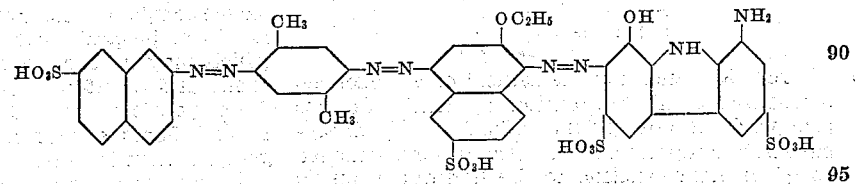

*Example 3.*—184 parts by weight of 4.4'-diamino-diphenyl are tetrazotized in the usual manner and coupled in a weakly acid solution with 319 parts by weight of 1-amino-8-naphthol-3.6-disulfonic acid. The diazoazodyestuff thus obtained is then coupled in a soda alkaline solution with 93 parts by weight of diazotized aniline, and finally the diazodisazodyestuff is coupled with 263 parts by weight of 2-hydroxy-carbazole-7-sulfonic acid in the presence of pyridine. After working up the dyestuff a black powder is obtained which dyes cotton, silk and viscose silk greenish-grey shades. In its free state the dyestuff corresponds to the following formula:

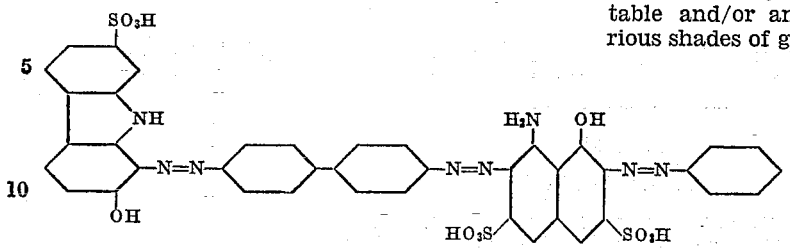

*Example 4.*—358 parts by weight of the azodyestuff prepared from 1 molecular proportion of diazotized p-nitraniline, coupled in an alkaline solution with 1 molecular proportion of 2-amino-8-hydroxynaphthalene-6-sulfonic acid, which is reduced to the amino-azodyestuff by means of sodium sulfide, are tetrazotized in the usual manner in concentrated solution with 70 parts by weight of sodium nitrite and 350 parts by weight of hydrochloric acid of 19½° Bé. While stirring, the solution is then added ice-cold to a concentrated soda alkaline solution of 716 parts by weight of 1-amino-8-hydroxy-carbazole-3.6-disulfonic acid in the presence of some pyridine. After a short time the coupling is complete. The trisazodyestuff is salted out and filtered. After drying a black powder is obtained which dyes cotton, viscose silk and silk black shades of good fastness properties. In its free state the dyestuff corresponds to the following formula:

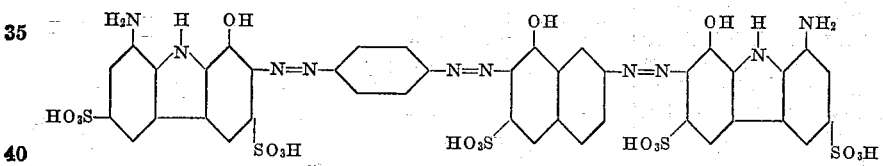

As final components in these dyestuffs also other than the carbazole derivatives capable of being coupled described in the examples may be employed, as for example, 1.8-dihydroxy-carbazole-3.6-disulfonic acid, 2-hydroxy-3-aminocarbazole, 2-hydroxy-carbazole-3-carboxylic acid, 7-hydroxy-α.α-dinaphthocarbazole-7'-sulfonic acid, 7-hydroxy-α.α-dinaphthocarbazol-4'.8'-disulfonic acid and the like.

I claim:

1. The azodyestuffs of the general formula:

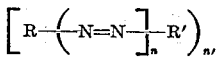

wherein R stands for the radical of a diazotized aminoazodyestuff containing at least two azo groups, R' stands for the radical of a hydroxy-carbazole compound, the azo group being attached to R' in ortho-position to the hydroxy group, n and n' stand for the numbers one or two, but n and n' not simultaneously standing for two, and wherein R may be substituted by hydroxyl, alkoxy, aryloxy, alkyl a substituted amino group, the nitro group, halogen the sulfonic acid group and the carboxylic acid group and R' may be substituted by hydroxyl, alkoxy, aryloxy, alkyl, the amino group, the nitro group, halogen, the sulfonic acid group and the carboxylic acid group, being generally dark powders, and dyeing vegetable and/or animal fibers and/or leather various shades of good fastness to light.

2. The azodyestuffs of the general formula:

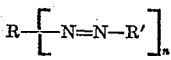

wherein R stands for the radical of a diazotized aminoazodyestuff containing at least two azo groups, R' stands for the radical of a hydroxy-carbazole compound, the azo group being attached to R' in ortho-position to the hydroxy group, n stands for the numbers one or two, and wherein R may be substituted by hydroxyl, alkoxy, aryloxy, alkyl, a substituted amino group, the nitro group, halogen, the sulfonic acid group and the carboxylic acid group, and R' may be substituted by hydroxyl, alkoxy, aryloxy, alkyl, the amino group, the nitro group, halogen, the sulfonic acid group and the carboxylic acid group, the coupling components being selected in such a manner that at least one contains as substituent a sulfonic acid group, being generally dark powders, and dyeing vegetable and/or animal fibers and/or leather various shades of good fastness to light.

3. The azodyestuffs of the general formula:

R—N=N—R'—N=N—R''—N=N—R''' wherein R, R' and R'' stand for benzene or naphthalene nuclei which may be substituted by hydroxyl, alkoxy, aryloxy, alkyl, a substituted amino group, the nitro group, halogen, the sulfonic acid group and the carboxylic acid group, and R''' stands for a radical of a hydroxy-carbazole compound, the azo group being attached to R'' in ortho-position to the hydroxy group and which may be further substituted by an amino group and a sulfonic acid group, being generally dark powders, and dyeing vegetable and/or animal fibers and/or leather various shades of good fastness to light.

4. The azodyestuff of the following formula:

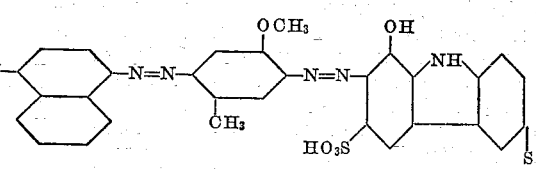

being a black powder and dyeing cotton, silk, viscose silk and chrome leather greyish-blue to blueish-black shades of good fastness to water, light and brightening.

RICHARD STÜSSER.